United States Patent
Peitzer et al.

(10) Patent No.: US 9,066,300 B2
(45) Date of Patent: Jun. 23, 2015

(54) DYNAMIC POWER CLASS RE-REGISTRATION OF MOBILE DEVICES

(71) Applicants: AT&T Mobility II LLC, Atlanta, GA (US); AT&T INTELLECTUAL PROPERTY I, L.P., Atlanta, GA (US)

(72) Inventors: Haywood Peitzer, Randolph, NJ (US); Arthur Richard Brisebois, Cumming, GA (US); Steven A. Harbin, Austin, TX (US); James Gordon Beattie, Jr., Bergenfield, NJ (US); Richard J. Mountford, Millersville, MD (US)

(73) Assignees: AT&T MOBILITY II LLC, Atlanta, GA (US); AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 13/708,559

(22) Filed: Dec. 7, 2012

(65) Prior Publication Data
US 2014/0162592 A1 Jun. 12, 2014

(51) Int. Cl.
*H04M 11/00* (2006.01)
*H04W 52/04* (2009.01)

(52) U.S. Cl.
CPC ..................... *H04W 52/04* (2013.01)

(58) Field of Classification Search
CPC .......... H04W 52/0209; H04W 52/283; H04W 60/06; H04W 52/367; H04W 52/04
USPC ..................... 455/13.4, 522, 127.1
See application file for complete search history.

(56) References Cited

U.S. PATENT DOCUMENTS

| | | | |
|---|---|---|---|
| 6,272,340 B1* | 8/2001 | Wright et al. ................. 455/427 |
| 6,799,030 B2* | 9/2004 | Barber et al. ............... 455/343.1 |
| 2002/0045447 A1 | 4/2002 | Rasanen |
| 2003/0119503 A1* | 6/2003 | Shohara et al. ............... 455/434 |
| 2005/0288022 A1 | 12/2005 | Ryu et al. |
| 2006/0073829 A1 | 4/2006 | Cho et al. |
| 2007/0026795 A1* | 2/2007 | de La Chapelle ............ 455/13.4 |
| 2007/0026861 A1 | 2/2007 | Kuhn et al. |
| 2007/0177565 A1* | 8/2007 | Lee ................................ 370/342 |

(Continued)

OTHER PUBLICATIONS

Office of Engineering and Technology, Cellular Telephone Specific Absorption Rate (SAR), http://www.fcc.gov/cgb/sar, Jun. 25, 2012, Last accessed Feb. 21, 2013.

(Continued)

*Primary Examiner* — Kwasi Karikari
*Assistant Examiner* — Edward Zhang
(74) *Attorney, Agent, or Firm* — Amin, Turocy & Watson, LLP

(57) ABSTRACT

Dynamic power class re-registration of wireless devices is provided. A wireless device can exchange data with a communications network. While exchanging data, the device can monitor its usage and based on the usage, generate a power change request. The device can then send the power change request to the communications network, prior to or in conjunction with powering down the device. In this regard, the communications network can receive the power change request, generate instructions for the wireless device, and adjust network resources based on the power change request. The instructions can then be sent to the wireless device. Since the device re-registers its power class with the communications network, handoffs, internetwork thresholds, network resources and other network parameters can be adjusted to compensate for the changed power class resulting into improved service for a user of the wireless device.

20 Claims, 13 Drawing Sheets

(56) References Cited

U.S. PATENT DOCUMENTS

| | | | |
|---|---|---|---|
| 2007/0248051 A1 | 10/2007 | Nagaraj et al. | |
| 2008/0063031 A1* | 3/2008 | Kanter | 375/141 |
| 2008/0095092 A1* | 4/2008 | Kim | 370/311 |
| 2008/0280615 A1 | 11/2008 | Vinayakray-Jani | |
| 2009/0047998 A1 | 2/2009 | Alberth, Jr. | |
| 2009/0170510 A1 | 7/2009 | Kim | |
| 2010/0246598 A1* | 9/2010 | Bremer et al. | 370/464 |
| 2011/0158117 A1 | 6/2011 | Ho et al. | |
| 2012/0001841 A1* | 1/2012 | Gokingco et al. | 345/102 |
| 2012/0147801 A1 | 6/2012 | Ho et al. | |
| 2012/0176979 A1 | 7/2012 | Kim et al. | |

OTHER PUBLICATIONS

Specific Absorption Rate, http://en.wikipedia.org/wiki/Specific_absorption_rate, Oct. 2, 2012, Last accessed Feb. 21, 2013.

Office of Engineering and Technology, Radio Frequency Safety, http://transition.fcc.gov/oet/rfsafety/sar.html, Jun. 25, 2012, Last accessed Feb. 21, 2013.

Office Action dated Aug. 14, 2014 for U.S. Appl. No. 13/682,325, 31 pages.

Notice of Allowance dated Jan. 15, 2015 for U.S. Appl. No. 13/682,325, 22 pages.

* cited by examiner

DYNAMIC POWER CLASS RE-REGISTRATION OF MOBILE DEVICES

TECHNICAL FIELD

The subject disclosure relates to wireless communications and, more particularly, dynamic power re-registration of mobile devices.

BACKGROUND

Communications systems, networks, and devices have seen an explosive growth in the past few years. In the future, they are expected to experience continuing growth with respect to applications, services, and/or functionality provided to a user. One area of growth has been in portable electronic devices, including smart phones and tablets that are capable of connecting to communication networks. One issue with portable electronic devices that are capable of connecting with communications networks is that the Federal Communications Commission ("FCC") regulates the specific absorption rate (SAR) of RF energy absorbed by the user of the device.

DETAILED DESCRIPTION

Figure 1:
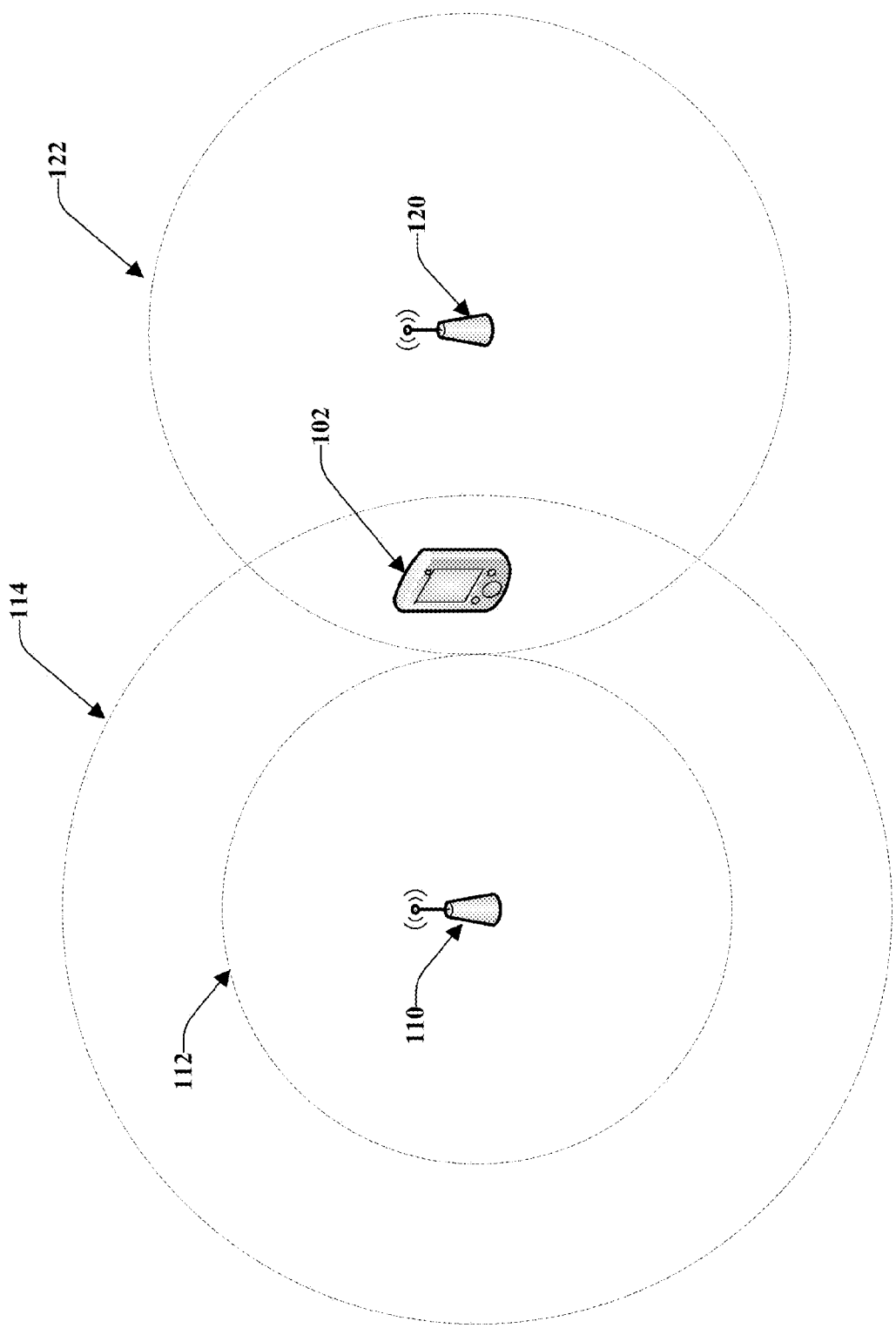
FIG. 1 illustrates an example impact of a reduced power mobile device.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Currently, mobile device usually connect to a wireless network at full power class. As the user handles the mobile device, maximum power is reduced or capped in order to comply with Federal Communication Commission ("FCC") Specific Absorption Rate ("SAR") value. The SAR value corresponds to the relative amount of RF energy is absorbed in the head, or other part of the body, of a user of a wireless handset. For example, the current FCC limits for public exposure from wireless devices is an SAR level of 1.6 watts per kilogram.

If the mobile device reduces or caps the power due to an SAR limit being reached, the communications network may not be aware of the power class reduction. If the power reduction occurs without knowledge by the network, miscalculations by the network during handoffs and other resource allocations can cause service interruptions to the user of the device. For example, the communications network can continue to instruct the mobile device to power up to full power; however, the mobile device, unable to power up, continues to drag service past an uplink limit until service disconnects.

Power reductions initiated by the device due to the device reaching SAR limits are generally locally handled by the device. For example, a device, using a proximity sensor, can determine, over time, how much RF energy is being absorbed by the user of the device. As the FCC limit is approached or reached, the device can power down, and operate at less than full power class. Presently, the communications network is not aware of this power reduction, which can result in miscalculations of the radio link and resource allocation for the device.

Systems and method are disclosed herein for employing dynamic power class re-registration of wireless devices. A wireless device can exchange data with a communications network. While exchanging data, the device can monitor its usage and when an SAR threshold is reached, generate a power change request. The device can then send the power change request to the communications network, prior to or in conjunction with powering down the device. In this sense, the communications network can receive the power change request, generate instructions for the wireless device, and adjust network resources based on the power change request. The instructions can then be sent to the wireless device, in a manner typical with how the wireless device interacts with the communications network. It can be appreciated that because the device re-registering its power class with the communications network; handoffs, internetwork thresholds, network resources and other network parameters can be adjusted to compensate for the changed power class resulting into improved service for a user of the wireless device.

An apparatus can exchange data with a communications network device. It can monitor usage of the apparatus. Based on the apparatus usage, it can generate a power change request that requests a power change for the apparatus. It can then send the power change request to the communications network device. In one implementation, it can monitor the exchange of data with the communications network and identify a data gap present in the data being exchanged. The power change request can then be sent to the communications network device based on the data gap having been identified as present. I another implementation, a power registration timer can be starter based on the power change request. The power registration timer can be reset based on the data gap being identified as present. In another implementation, the power change request can be sent to the communications network based on a time represented by the power registration timer.

In another implementation, a system can receive power registration data from a user equipment, wherein the power registration data indicates a power reduction for the user equipment. A set of device instructions can be generated based on the power registration data. The set of device instructions can be directed to be sent to the user equipment. In one implementation, a set of network instructions can be generated based on the power registration data for application to a set of network resources. The system can then initiate adjustment of the set of network resources based on the set of network instructions.

Referring now to FIG. 1, there is illustrated an example impact of a reduced power mobile device. It can be appreciated that the depicted example is just one impact of a reduced power mobile device. Mobile device 102 can be a smart phone, tablet computer, personal computer, LTE modem, etc. It can be appreciated that mobile device 102 is capable of wirelessly connecting with a communications network. Network resources 110 and 120 are depicted as antennas, and represent a radio access network or base transceiver station or the like capable of communicating wirelessly with mobile device 102. It can be appreciated that any suitable wireless communication technology can be used, for example, LTE, 4G, 3G, WCDMA, UMTS, EDGE, GPRS, etc. Coverage areas 112 and 114 respectively depict two distinct areas of coverage for network resource 110. The inner area of coverage, 112, shows the area surrounding the network resource 110 which is capable of communicating with a powered down mobile device 102. For example, a mobile device that has reached a SAR threshold and is powered down as a result. The outer area of coverage, 114, shows the area surrounding the network resource 110 which is capable of communicating with a fully powered mobile device 102. Coverage area 122 depicts a distinct area of coverage for network resource 120 and is capable of communication with either a fully powered mobile device 102 or a reduced powered mobile device 102.

In a first usage scenario, mobile device 102 is fully powered and in communication with network resource 110 and exchanging data packets. During the exchange of data, an SAR threshold is reached, causing mobile device 102 to reduce its power. Without communicating the reduction in power to network resource 110, upon reducing its power, mobile device 102 is no longer within an area of coverage capable of communicating with network resource 110. Although mobile device 102 is capable of communicating with network resource 120, a proper handoff was likely not effectuated, because network resource 110 was not aware that mobile device 102 was in danger of powering down. Thus, a service interruption is possible as mobile device 102 attempts to connect with network resource 120 without a handoff. If instead, mobile device 102 re-registered its power level with network resource 110, prior to or contemporaneous with powering down, network resource 110 and network resource 120 could work together in a typical handoff without causing a potential service interruption for the user of mobile device 102. For example, if the device is powered down by 3 dB, then readings for neighboring network resources in a handoff situation can be read and given sooner to make a handoff.

In a second usage scenario, mobile device 102 is connected to network resource 120. As stated above, mobile device 102 is within area of coverage 122, and thus mobile device 102 is capable of communicating with network resource 120 either fully powered or after having its power reduced. Mobile device then requests a set of data packets from network resource 120. Network resource 120 can work with the network to determine a power headroom or data code power for the data that needs to be sent to mobile device 120. For example, based on the full power of mobile device 102, a certain amount of energy per bit can be allocated. Network resource 120 then uses the allocated energy per bit to send the data. If mobile device 102 is instead running at a reduced power, network resource 120 will still attempt to use the full bandwidth to send the data; however, the underpowered phone may lack the power to receive all the data packets, without packet loss. Thus, the network resource 120 being unaware of reduced power mobile device 102 can cause service interruptions or service failure to mobile device 102. If instead, mobile device 102 re-registered its power level with network resource 120, prior to or contemporaneous with powering down, network resource 120 could properly calibrate the data code power for its transmissions reducing the likelihood of packet loss or other related problems.

It can be appreciated that the previous two usage scenarios are examples of the problems faced by providing wireless services to a mobile device that reduces its power without registering the reduced power with the network. It can be further appreciated that other issues, such as internetwork thresholds, network resource management, or other parameters or processes within the communications network can function more efficiently with accurate power information related to mobile devices accessing the network.

Figure 2:
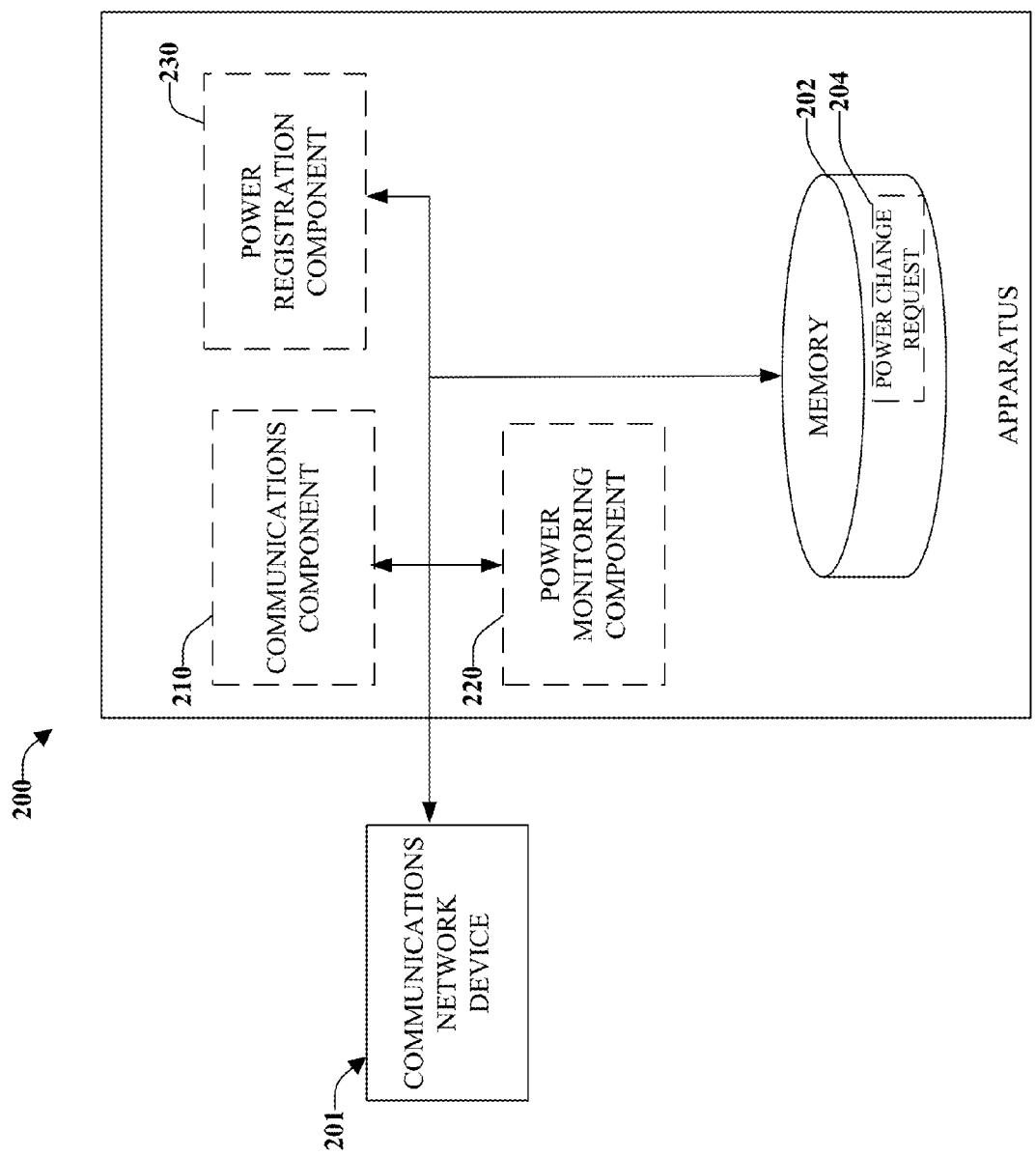
FIG. 2 illustrates an example apparatus capable of power re-registration.

Referring now to FIG. 2, there is illustrated an example apparatus capable of power re-registration. Apparatus 200 can be a user equipment ("UE") such as a smart phone, a tablet computer, a personal computer, a mobile hot spot, a modem, etc. Communications component 210, power monitoring component 220, power registration component 230, and a memory can share a common bus and be in contact with communications network device 201. It can be appreciated that communications network device 201 can be an LTE network, a 4G network, a 3G network, a Wide band CDMA, a UMTS, an EDGE network, a GPRS Network, etc. Apparatus 200 can also contain, not pictured, the necessary hardware to effect a connection with communications network device 201, such as an antenna, wireless transceiver, etc.

Communications component 201 can exchange data with communications network device 201. Power monitoring component 220 can monitor apparatus 200 usage and generate a power change request, based at least in part, on the apparatus usage, that request a power change for the apparatus. For example, the power monitoring component can measure, using a proximity sensor, how close the apparatus is to the user. A proximity sensor can also determine if the apparatus is near the head or the body. It can be appreciated that algorithms can be established based on FCC guidelines or other best practices to determine when a power change request should be generated to protect the safety of the user.

In one implementation, power monitoring component 220 can monitor apparatus usage further based on a set of user settings. For example, the user of a tablet computer may not place the tablet near their head, and thus wish to disable proximity sensing. In another example, the user of a smart phone that uses it for executing applications and not for placing phone calls may wish to reduce the sensitivity of the proximity sensor, or increase the level of usage prior to a power change request being generated by power monitoring component 220. In one implementation, warning can be provided to the user regarding potential health consequences associated with disabling the proximity sensor.

Power registration component 230 can send the power change request to the communications network device 201. In one implementation, the power change request can include a target power level. For example, a level, in mW, of the desired reduced power level for apparatus 200.

Figure 3:
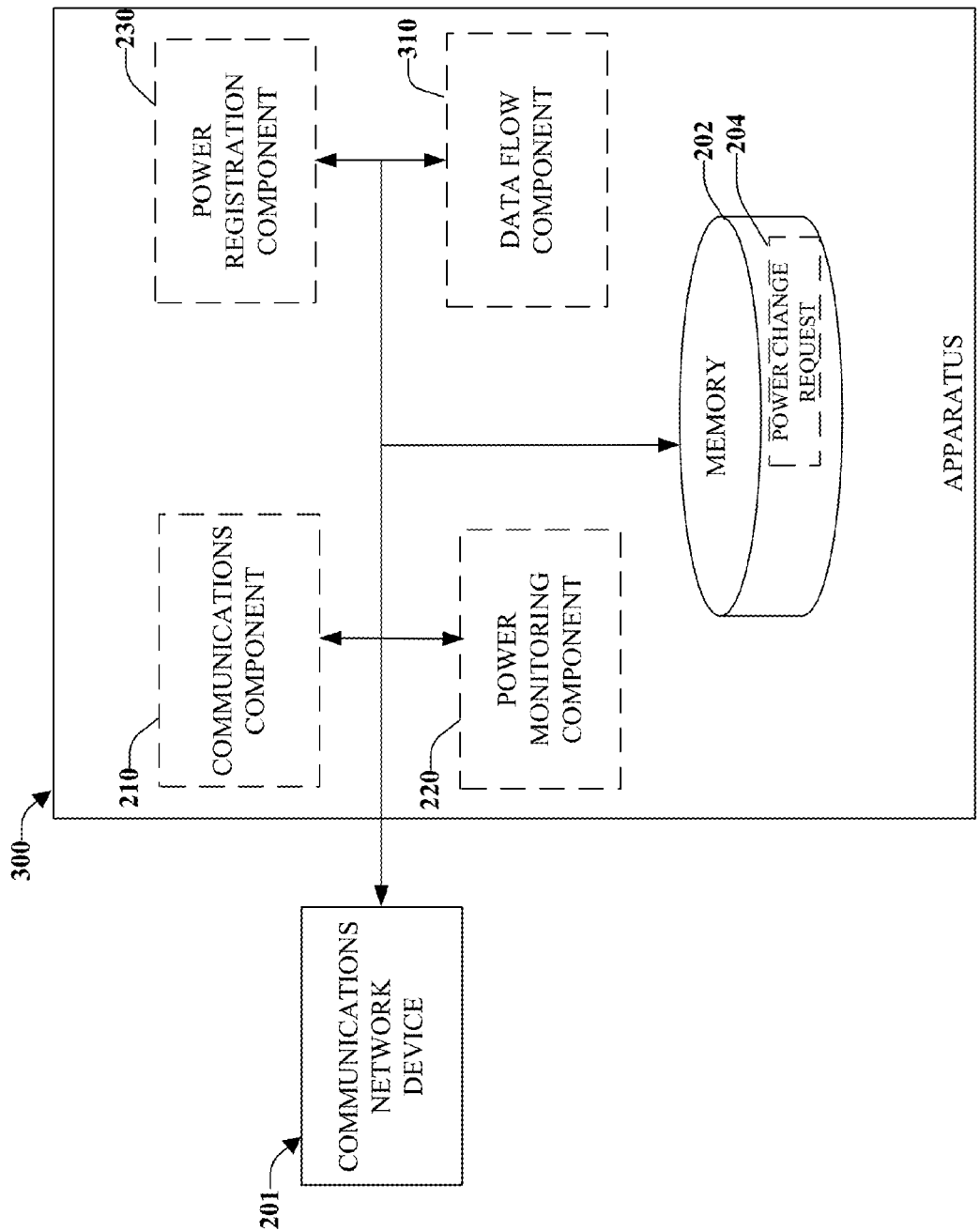
FIG. 3 illustrates an example apparatus capable of power re-registration including a data flow component.

Referring now to FIG. 3, there is illustrated an example apparatus capable of power re-registration including a data flow component. Data flow component 310 can monitor the exchange of data with the communications network and determine a data gap. For example, a data gap can be a moment in time where the apparatus and communications network device 201 are not exchanging data packets, such as when a user of the apparatus is not making a call or running an application, or when the apparatus isn't executing an application that is exchanging data with communications network device 201. In one implementation, power registration component 230 sends the power change request to the communications network device 201 based on the data gap. It can be appreciated that by determining a data gap, power registration data can be exchanged at a time that does not interrupt the service of the user.

Figure 4:
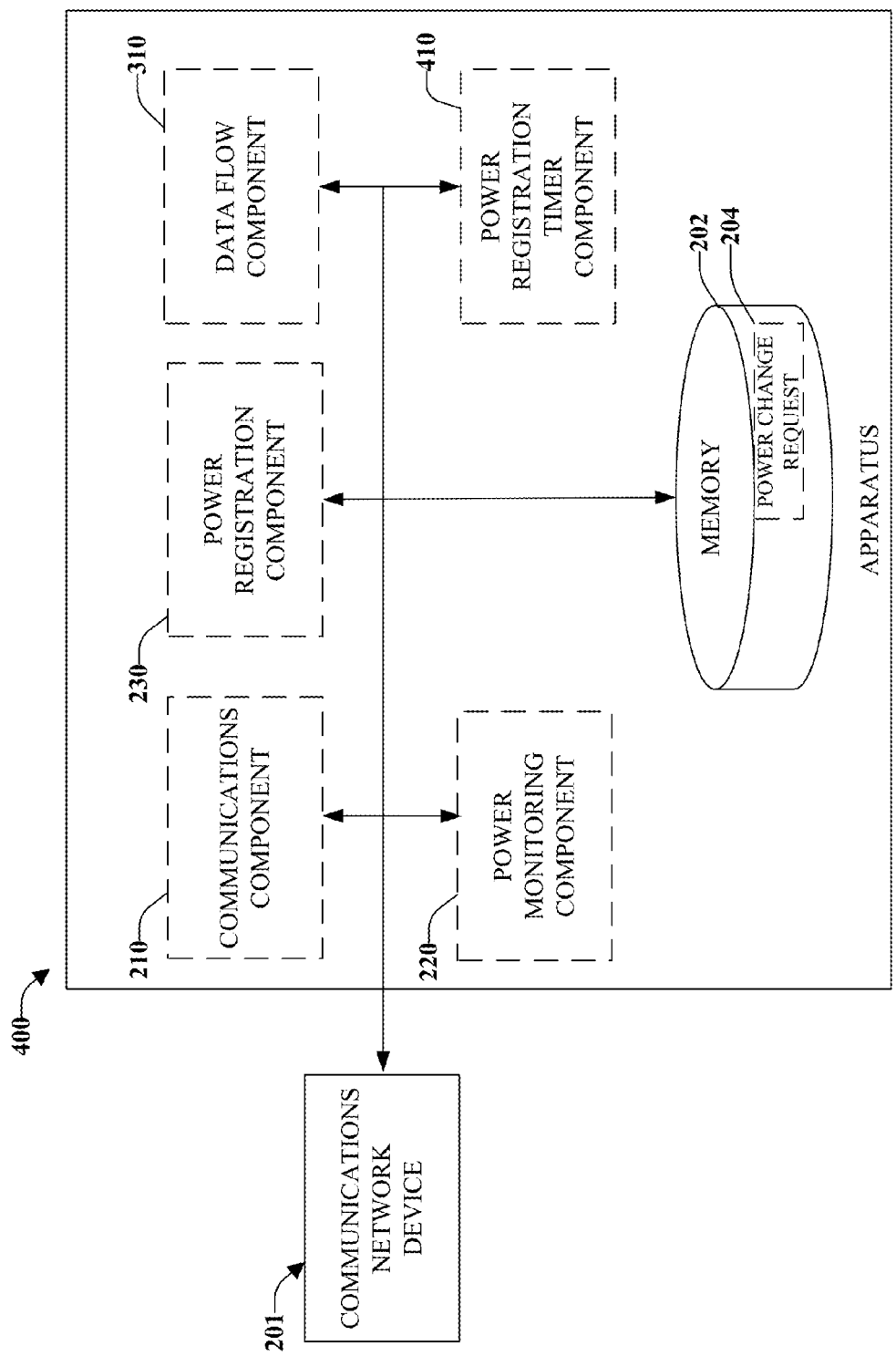
FIG. 4 illustrates an example apparatus capable of power re-registration including a power registration timer component.

Referring now to FIG. 4, there is illustrated an example apparatus capable of power re-registration including a power registration timer component. Power registration timer component 410 can start a power registration timer based on the power change request. In implementation, the power registration time is reset based on the data gap. For example, a timer starts when a power change request is generated. During the running of the timer, data flow component 310 monitors the exchange of data to determine a data gap. If a data gap is found, then the power registration data is sent during the gap. However, if a data gap is not found, and the timer runs out, then the power registration data can be sent, without a data gap, at the expiration of the timer. It can be appreciated that the timer can be adjusted to prevent negative health impacts associated with a device not powering down rapidly enough. Thus, in one implementation, the power registration component 230 can send the power change request to the communications network based on the power registration timer. It can be appreciated that it is beneficial to avoid a deluge of power messages being sent, as too much messaging can also negatively impact user services and communication network performance.

Figure 5:
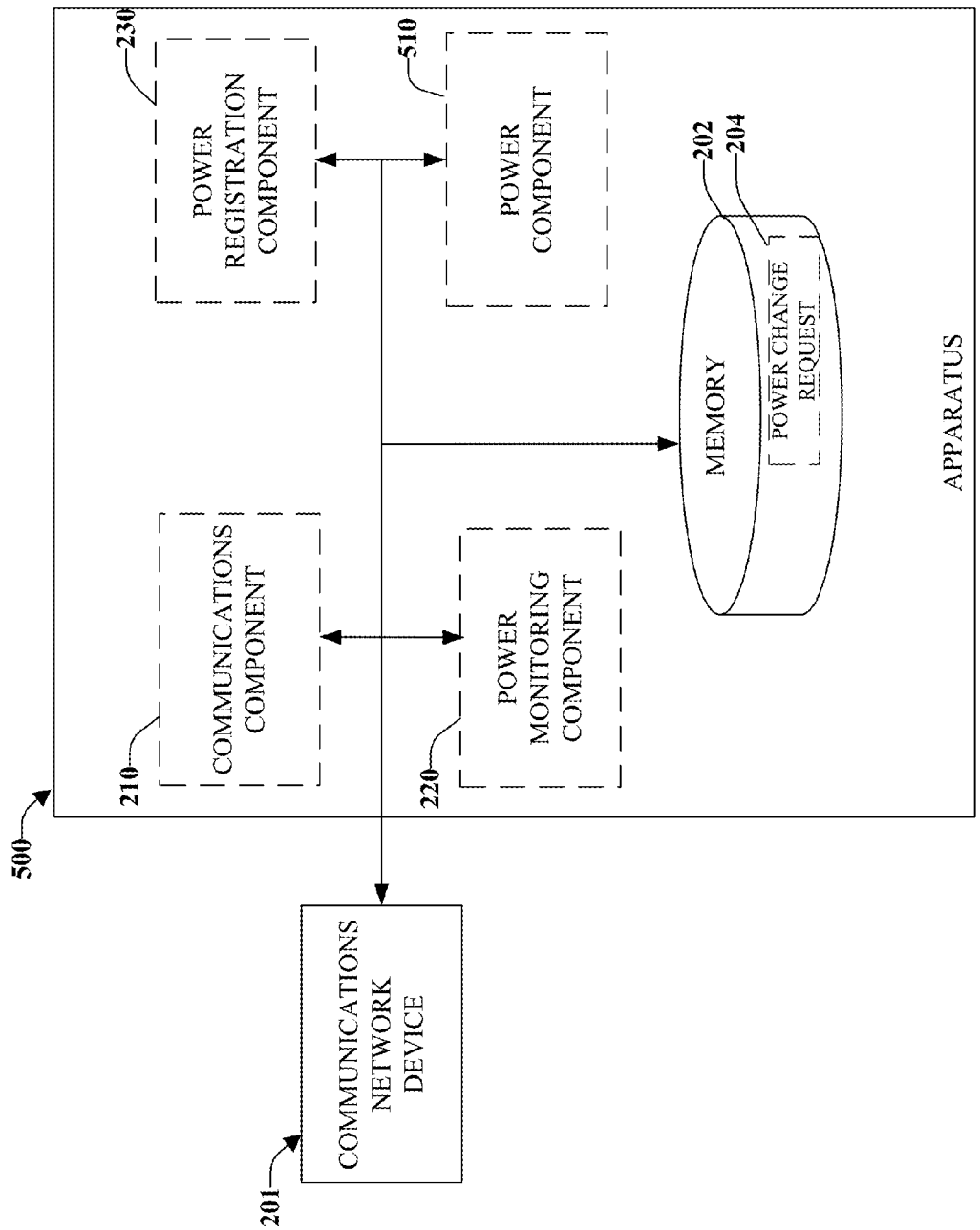
FIG. 5 illustrates an example apparatus capable of power re-registration including a power component.

Referring now to FIG. 5, there is illustrated an example apparatus capable of power re-registration including a power component. Power component 510 can adjust at least one of control power or user plane power based on the power monitoring component generating the power change request. In one implementation, power component 510 can adjust at least one of control power or user plane power further based on receiving a set of power down instructions from communications network device 201. For example, upon the power change request being generated, power component 510 can wait a period of time to receive instructions from communication network 201, and if instructions are not received during that period of time, power down the device without receiving instructions.

In one implementation, power component 510 can adjust at least one of control power or user plane power further based on the device instructions. For example, the control plane can remain at full power to carry control information to and from communications network device 201 while limiting the user plane power. It can be appreciated that by reducing user plane power, user services may slow, but service interruptions may be prevented by retaining full power on the control plane.

Figure 6:
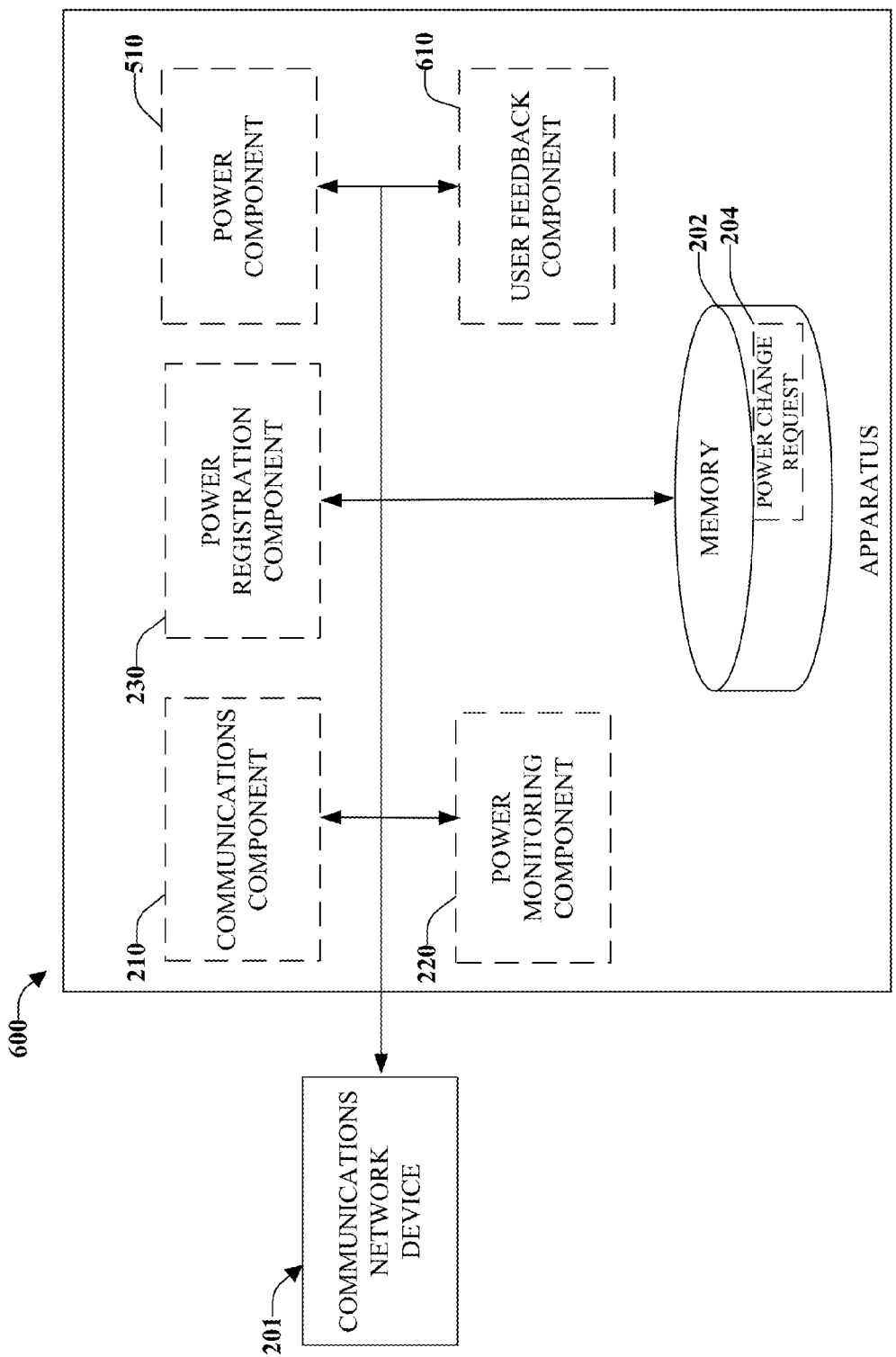
FIG. 6 illustrates an example apparatus capable of power re-registration including a user feedback component.

Referring now to FIG. 6, there is illustrated an example apparatus capable of power re-registration including a user feedback component. User feedback component 610 can facilitate providing of feedback to a user of the apparatus based on the power component adjustments. For example, a message on a display of the apparatus can appear alerting the user that the device has been powered down. In one implementation, the message can include a link to the user settings referenced above in regards to FIG. 2, so that a user can adjust power settings to a different setting if they desire. In another example, an audible indication can be emitted that alerts a user to a lowered power setting.

Figure 7:
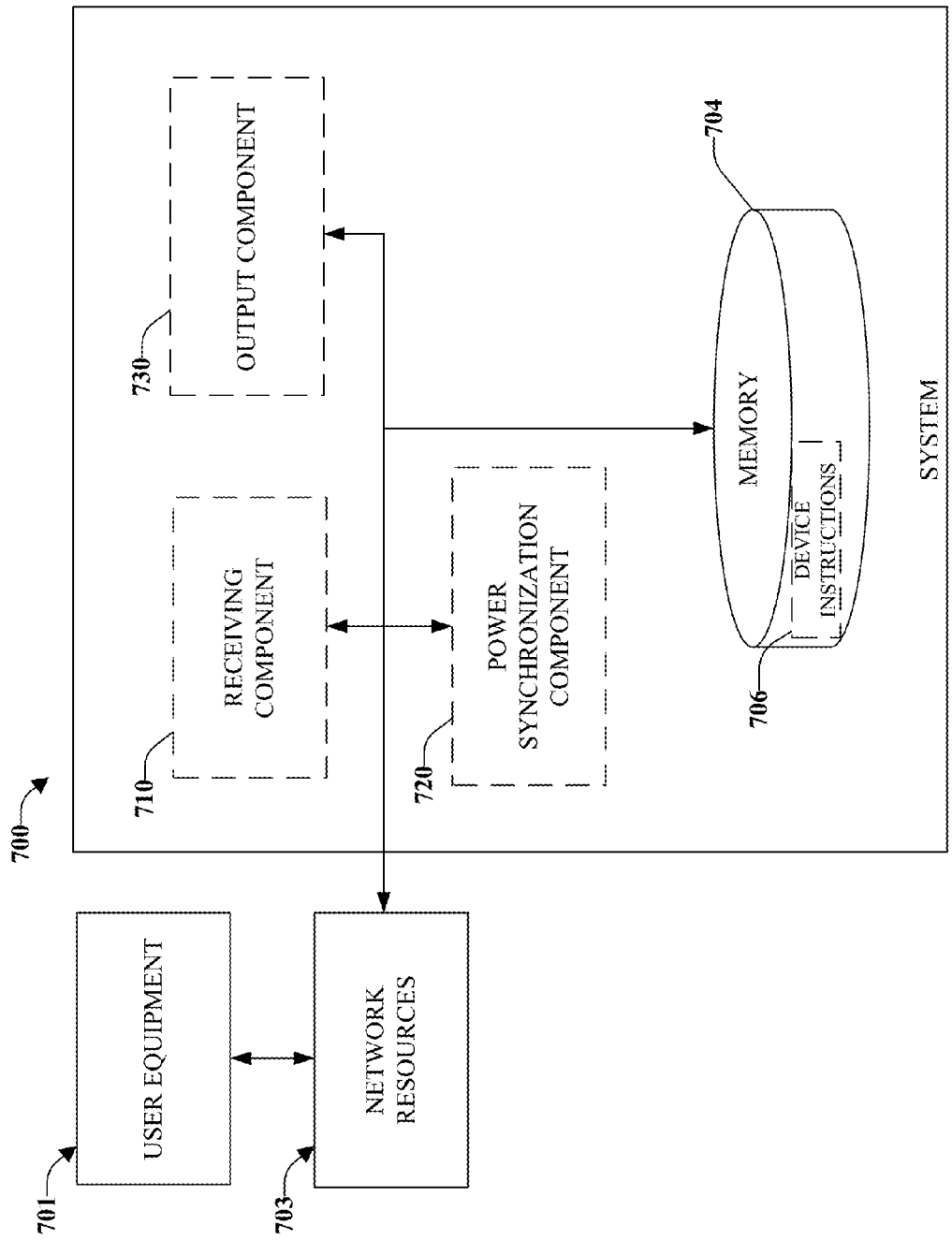
FIG. 7 illustrates an example system administering power class changes.

Referring now to FIG. 7, there is illustrated an example system administering power class changes. A receiving component 710 can receive power registration data from a user equipment, wherein the power registration data indicates a power reduction. A power synchronization component 720 can generate a set of device instructions based on the power registration data. In one implementation, power synchronization component 720 further generates a set of network instructions based on the power registration data. Output component 730 can direct the set of device instructions be sent to the user equipment.

Figure 8:
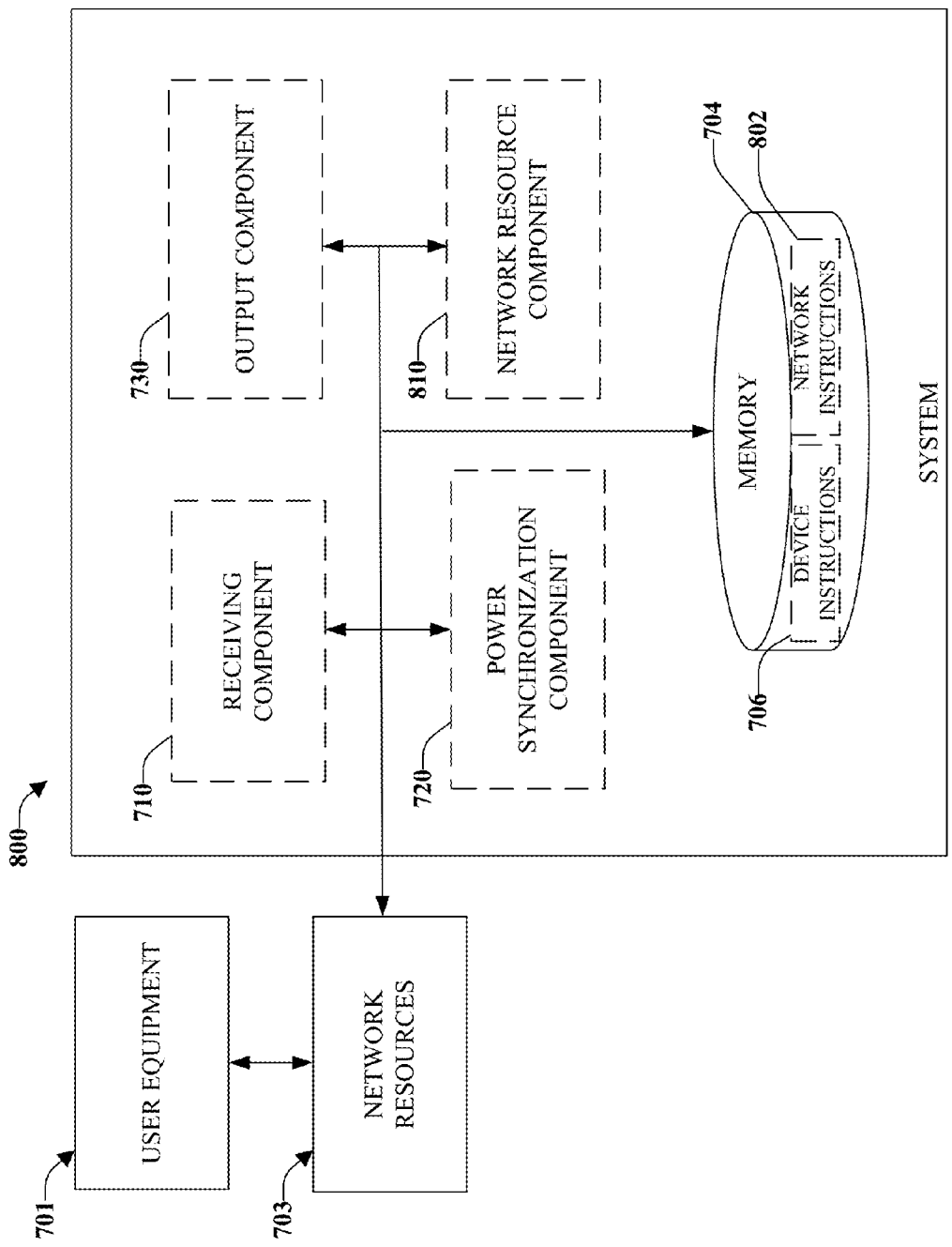
FIG. 8 illustrates an example system administering power class changes including a network resource component.

Referring now to FIG. 8, there is illustrated an example system administering power class changes including a network resource component. Network resource component can initiate an adjustment of a set of network resources based on the set of network instructions. For example, handoff instructions can be altered, power headroom can be adjusted, data code power can be adjusted, etc.

Figure 9:
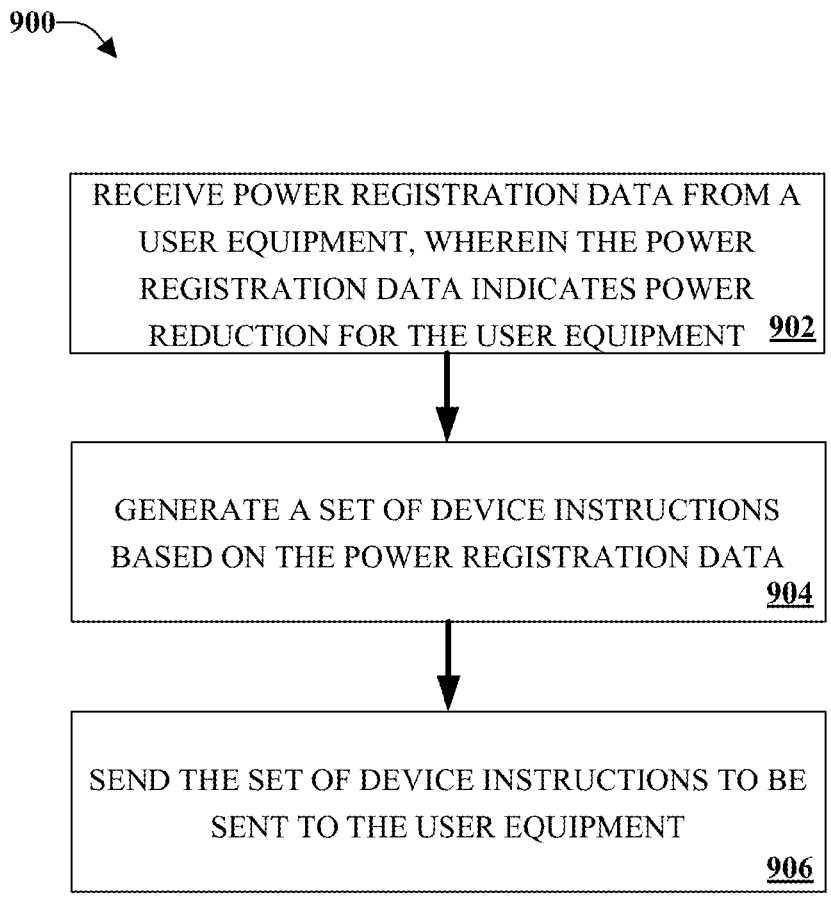
FIG. 9 illustrates an example method for administering power class changes.
Figure 10:
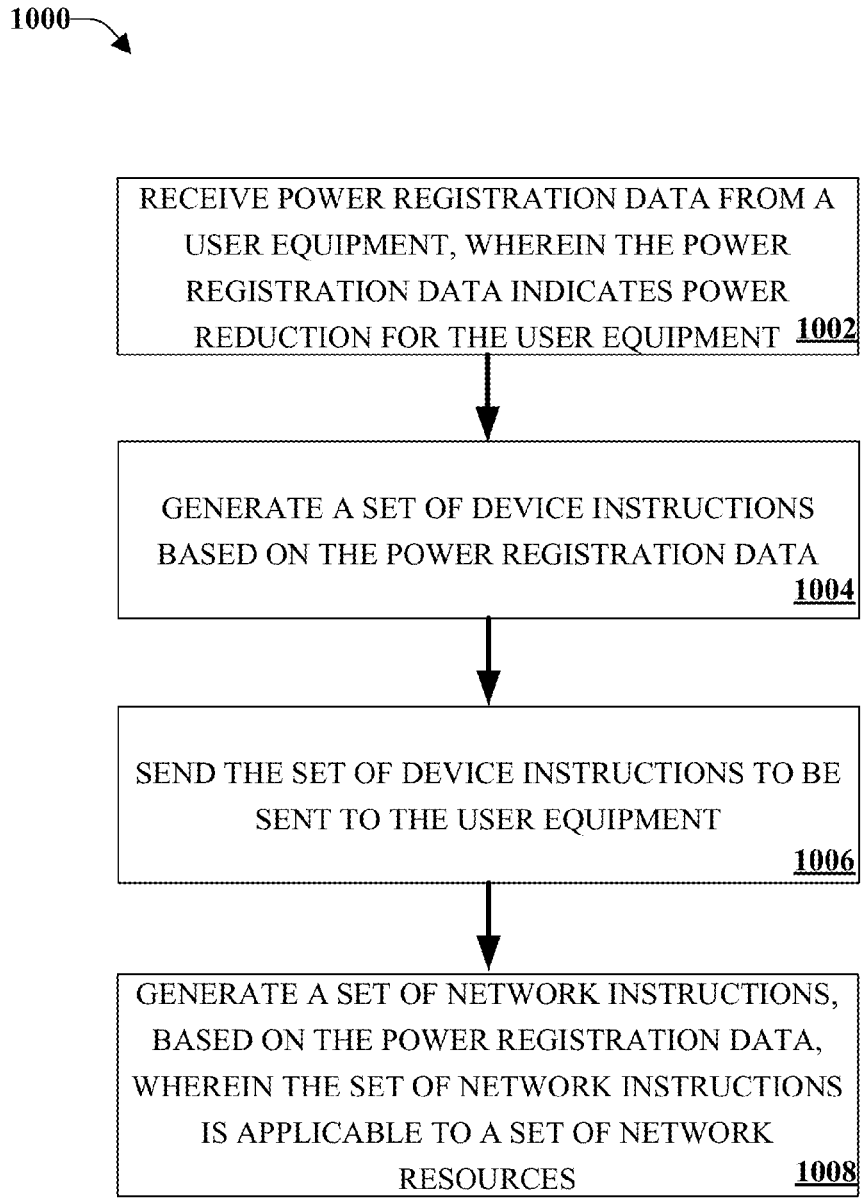
FIG. 10 illustrates an example method for administering power class changes including generating network instructions.
Figure 11:
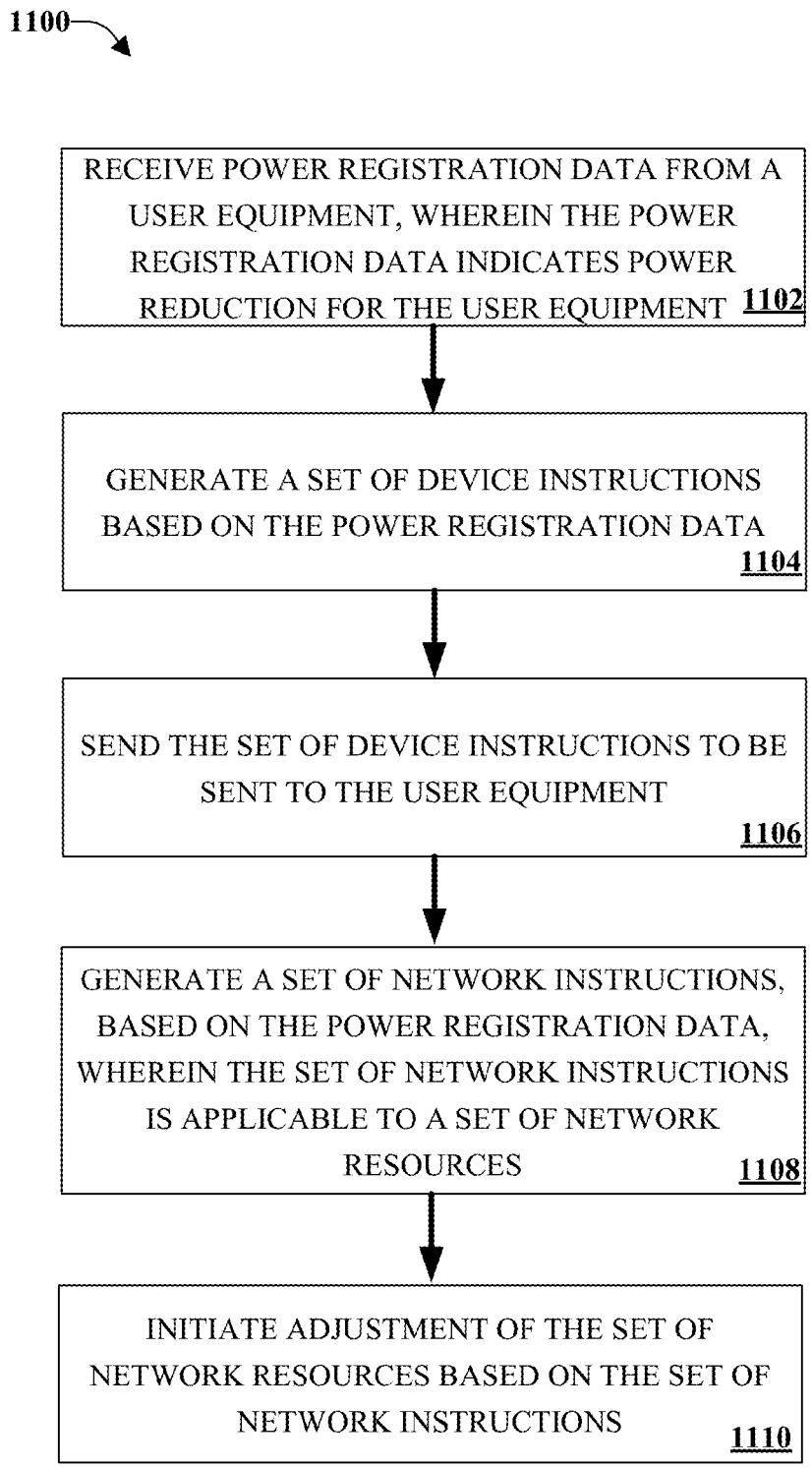
FIG. 11 illustrates an example method for administering power class changes including adjusting network resources.

FIGS. 9-11 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring now to FIG. 9, there is illustrated an example method for administering power class changes. At 902, power registration data can be received form a user equipment, wherein the power registration data indicates a power reduction for the user equipment. At 904, a set of device instructions can be generated based on the power registration data. At 906, the set of device instructions can be directed to be sent to the user equipment.

Referring now to FIG. 10, there is illustrated an example method for administering power class changes including generating network instructions. At 1002, power registration data can be received form a user equipment, wherein the power registration data indicates a power reduction for the user equipment. At 1004, a set of device instructions can be generated based on the power registration data. At 1006, the set of device instructions can be directed to be sent to the user equipment. At 1008, a set of network instructions can be generated, based on the power registration data, for application to a set of network resources.

Referring now to FIG. 11, there is illustrated an example method for administering power class changes including adjusting network resources. At 1102, power registration data can be received form a user equipment, wherein the power registration data indicates a power reduction for the user equipment. At 1104, a set of device instructions can be generated based on the power registration data. At 1106, the set of device instructions can be directed to be sent to the user equipment. At 1108, a set of network instructions can be generated, based on the power registration data, for application to a set of network resources. At 1110, a set of network resources can be adjusted based on the set of network instructions.

Figure 12:
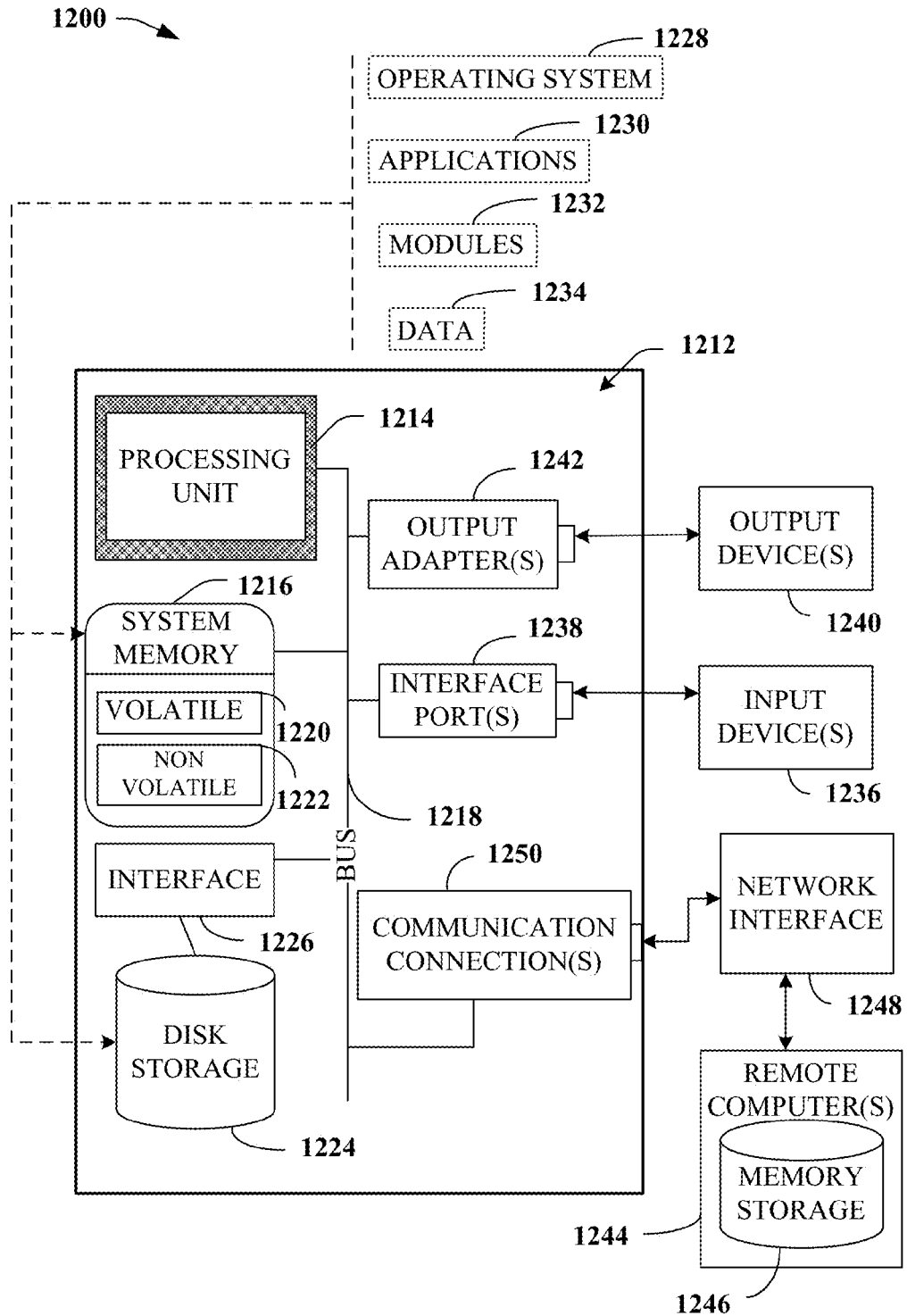
FIG. 12 illustrates a block diagram of a computer operable to execute the disclosed communication architecture.

Turning now to FIG. 12 there illustrated is a block diagram of a computing system 1200 operable to execute the disclosed systems and methods in accordance with an embodiment. Computer 1212 (which can be, for example, part of the hardware of a component includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 11124), and Small Computer Systems Interface (SCSI).

System memory 1216 includes volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be noted that the disclosed subject matter can be implemented with various operating systems or combinations of operating systems.

A user can enter commands or information into computer 1211 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1214 through system bus 1218 by way of interface port(s) 1238. Interface port(s) 1238 include, for example, a serial port, a parallel port, a game port, a universal serial bus (USB), an infrared port, a Bluetooth port, an IP port, or a logical port associated with a wireless service, etc. Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically connected by way of communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, ISDN adapters, and Ethernet cards.

Figure 13:
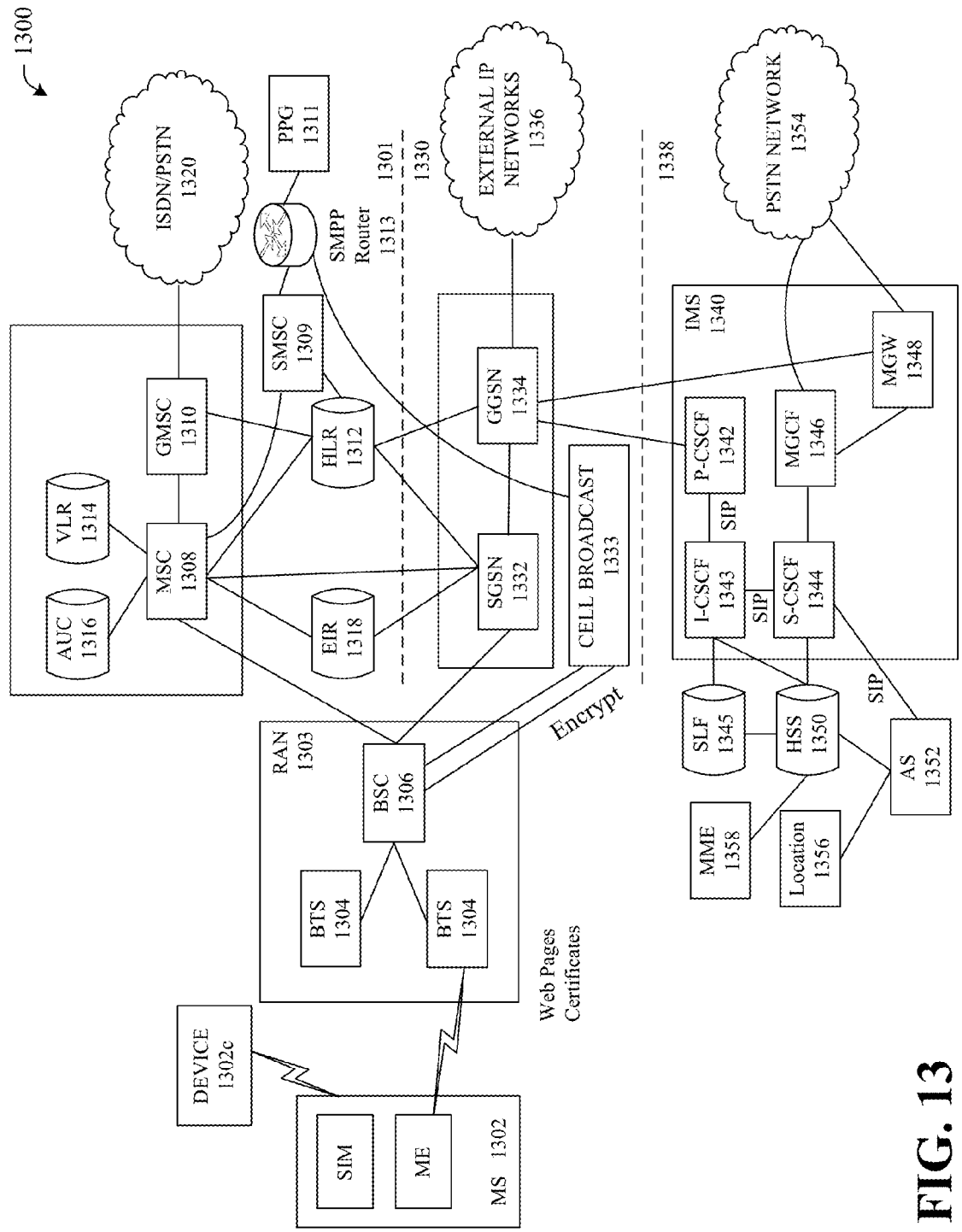
FIG. 13 illustrates a Global System for Mobile Communications (GSM)/General Packet Radio Service (GPRS)/Internet protocol (IP) multimedia network architecture that can employ the disclosed architecture.

Now turning to FIG. 13, such figure depicts an example GSM/GPRS/IP multimedia network architecture 1300 that can employ the disclosed communication architecture. In particular, the GSM/GPRS/IP multimedia network architecture 1300 includes a GSM core network 1301, a GPRS network 1330 and an IP multimedia network 1338. The GSM core network 1301 includes a Mobile Station (MS) 1302, at least one Base Transceiver Station (BTS) 1304 and a Base Station Controller (BSC) 1306. The MS 1302 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. It can be appreciated that MS 1302 can be substantially similar to Apparatus 200 and include functionality described with respect to Apparatus' 200-600.

The BTS 1304 is physical equipment, such as a radio tower, that enables a radio interface to communicate with the MS 1302. Each BTS can serve more than one MS. The BSC 1306 manages radio resources, including the BTS. The BSC 1306 can be connected to several BTSs. The BSC and BTS components, in combination, are generally referred to as a base station (BSS) or radio access network (RAN) 1303.

The GSM core network 1301 also includes a Mobile Switching Center (MSC) 1308, a Gateway Mobile Switching Center (GMSC) 1310, a Home Location Register (HLR) 1312, Visitor Location Register (VLR) 1314, an Authentication Center (AuC) 1318, and an Equipment Identity Register (EIR) 1318. The MSC 1308 performs a switching function for the network. The MSC also performs other functions, such as registration, authentication, location updating, handovers, and call routing. The GMSC 1310 provides a gateway between the GSM network and other networks, such as an Integrated Services Digital Network (ISDN) or Public Switched Telephone Networks (PSTNs) 1320. In other words, the GMSC 1310 provides interworking functionality with external networks.

The HLR 1312 is a database or component(s) that comprises administrative information regarding each subscriber registered in a corresponding GSM network. The HLR 1312 also includes the current location of each MS. The VLR 1314 is a database or component(s) that contains selected administrative information from the HLR 1312. The VLR contains information necessary for call control and provision of subscribed services for each MS currently located in a geographical area controlled by the VLR. The HLR 1312 and the VLR 1314, together with the MSC 1308, provide the call routing and roaming capabilities of GSM. The AuC 1316 provides the parameters needed for authentication and encryption functions. Such parameters allow verification of a subscriber's identity. The EIR 1318 stores security-sensitive information about the mobile equipment.

A Short Message Service Center (SMSC) 1309 allows one-to-one Short Message Service (SMS) messages to be sent to/from the MS 1302. A Push Proxy Gateway (PPG) 1311 is used to "push" (e.g., send without a synchronous request) content to the MS 1302. The PPG 1311 acts as a proxy between wired and wireless networks to facilitate pushing of data to the MS 1302. A Short Message Peer to Peer (SMPP) protocol router 1313 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1302 sends a location update including its current location information to the MSC/VLR, via the BTS 1304 and the BSC 1306. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1330 is logically implemented on the GSM core network architecture by introducing two packet-switching network nodes, a serving GPRS support node (SGSN) 1332, a cell broadcast and a Gateway GPRS support node (GGSN) 1334. The SGSN 1332 is at the same hierarchical level as the MSC 1308 in the GSM network. The SGSN controls the connection between the GPRS network and the MS 1302. The SGSN also keeps track of individual MS's locations, security functions, and access controls.

A Cell Broadcast Center (CBC) 1333 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1334 provides a gateway between the GPRS network and a public packet network (PDN) or other IP networks 1336. That is, the GGSN provides interworking functionality with external networks, and sets up a logical link to the MS 1302 through the SGSN 1332. When packet-switched data leaves the GPRS network, it is transferred to an external TCP-IP network 1336, such as an X.25 network or the Internet. In order to access GPRS services, the MS 1302 first attaches itself to the GPRS network by performing an attach procedure. The MS 1302 then activates a packet data protocol (PDP) context, thus activating a packet communication session between the MS 1302, the SGSN 1332, and the GGSN 1334. In a GSM/GPRS network, GPRS services and GSM services can be used in parallel. A GPRS network 1330 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network.

The IP multimedia network 1338 was introduced with 3GPP Release 5, and includes an IP multimedia subsystem (IMS) 1340 to provide rich multimedia services to end users. A representative set of the network entities within the IMS 1340 are a call/session control function (CSCF), a media gateway control function (MGCF) 1346, a media gateway (MGW) 1348, and a master subscriber database, called a home subscriber server (HSS) 1350. The HSS 1350 can be common to the GSM network 1301, the GPRS network 1330 as well as the IP multimedia network 1338.

The IP multimedia system 1340 is built around the call/session control function, of which there are three types: an interrogating CSCF (I-CSCF) 1343, a proxy CSCF (P-CSCF) 1342, and a serving CSCF (S-CSCF) 1344. The P-CSCF 1342 is the MS's first point of contact with the IMS 1340. The P-CSCF 1342 forwards session initiation protocol (SIP) messages received from the MS to an SIP server in a home network (and vice versa) of the MS. The P-CSCF 1342 can also modify an outgoing request according to a set of rules defined by the network operator (for example, address analysis and potential modification).

The I-CSCF 1343 forms an entrance to a home network and hides the inner topology of the home network from other networks and provides flexibility for selecting an S-CSCF. The I-CSCF 1343 can contact a subscriber location function (SLF) 1345 to determine which HSS 1350 to use for the particular subscriber, if multiple HSS's 1350 are present. The S-CSCF 1344 performs the session control services for the MS 1302. This includes routing originating sessions to external networks and routing terminating sessions to visited networks. The S-CSCF 1344 also decides whether an application server (AS) 1352 is required to receive information on an incoming SIP session request to ensure appropriate service handling. This decision is based on information received from the HSS 1350 (or other sources, such as an application server 1352). The AS 1352 also communicates to a location server 1356 (e.g., a Gateway Mobile Location Center (GMLC)) that provides a position (e.g., latitude/longitude coordinates) of the MS 1302. The MME 1358 provides authentication of a user by interacting with the HSS 1350 in LTE networks.

The HSS 1350 contains a subscriber profile and keeps track of which core network node is currently handling the subscriber. It also supports subscriber authentication and authorization functions (AAA). In networks with more than one HSS 1350, a subscriber location function provides information on the HSS 1350 that contains the profile of a given subscriber.

The MGCF 1346 provides interworking functionality between SIP session control signaling from the IMS 1340 and ISUP/BICC call control signaling from the external GSTN networks (not shown). It also controls the media gateway (MGW) 1348 that provides user-plane interworking functionality (e.g., converting between AMR- and PCM-coded voice). The MGW 1348 also communicates with a PSTN network 1354 for TDM trunks. In addition, the MGCF 1346 communicates with the PSTN network 1354 for SS7 links. According to an embodiment, the system 700, and 800 can be implemented within and/or communicatively coupled to the GSM network 1301, the GPRS network 1330, the IP multimedia network 1338, and/or the IP networks 1336.

As used in this application, the terms "component," "module," "system," "interface," "service," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In addition, the words "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," and similar terminology, refer to a wired or wireless device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Likewise, the terms "access point," "base station," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms "data flow," "data session," and the like are also employed interchangeably throughout the subject specification, unless context warrants particular distinction(s) among the terms.

Aspects or features of the subject innovation can be exploited in substantially any wired or wireless communication technology; e.g., Universal Mobile Telecommunications System (UMTS), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Zigbee, or another IEEE 802.XX technology. Additionally, substantially all aspects of the subject innovation can be exploited in legacy telecommunication technologies.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus, comprising:
   a memory that stores executable instructions; and
   a processor, coupled to the memory, that facilitates execution of the executable instructions to perform operations, comprising:
   sending power class registration data, comprising data indicating a power class registration associated with the apparatus, to a network device;
   generating apparatus power data associated with a specific absorption rate of the apparatus based on monitoring a usage of the apparatus in accordance with a configurable setting that allows selective enablement or disablement of apparatus user proximity sensing;
   in response to the apparatus power data being determined to satisfy a condition with respect to a threshold value, generating power class registration change request data that requests alteration of the power class registration data representing the power class registration associated with the apparatus; and
   sending the power class registration change request data to the network device.

2. The apparatus of claim 1, wherein the operations further comprise:
   determining whether a data gap is present in data being exchanged between the network device and the apparatus.

3. The apparatus of claim 2, wherein the sending comprises, in response to determining the data gap is present, sending the power class registration change request data to the network device.

4. The apparatus of claim 3, wherein the operations further comprise:
   starting a power class registration timer based on the power class registration change request data.

5. The apparatus of claim 4 wherein the operations further comprise, in response to determining the data gap is present, resetting the power class registration timer.

6. The apparatus of claim 4, wherein the sending comprises sending the power class registration change request to the network device based on a time represented by the power class registration timer.

7. The apparatus of claim 1, wherein the power class registration change request data comprises information representing a target apparatus power level.

8. The apparatus of claim 1, wherein the generating the power class registration change request data comprises generating a request to adjust control power for the apparatus.

9. The apparatus of claim 8, wherein the operations further comprise:
   facilitating provisioning of feedback via an interface of the apparatus relating to the control power being confirmed to have been adjusted by the apparatus.

10. The apparatus of claim 1, wherein the operations further comprise:
    in response to sending the power class registration change request data, receiving a device instruction from the network device.

11. The apparatus of claim 10, wherein the receiving the device instruction comprises receiving a direction to adjust a user plane power of the apparatus.

12. The apparatus of claim 10, wherein the operations further comprise:
    modifying a parameter of transmissions sent from the apparatus based on the device instruction.

13. A non-transitory computer readable storage device comprising executable instructions that, in response to execution, cause a system including a processor to perform operations, comprising:
    receiving power class registration change request associated with a device, wherein the power class registration change request indicates an alteration to a previous power class registration for the device requested in response to a determination, by the device in accordance with a configurable setting that facilitates enablement or disablement of user proximity sensing by the device, that a specific absorption rate of the device has satisfied a condition with respect to a threshold value;
    generating a device instruction based on the power class registration change request; and
    sending the device instruction to the device.

14. The non-transitory computer readable storage device of claim 13, further comprising generating a network instruction based on the power class registration change request, wherein the network instruction is applicable to a network resource.

15. The non-transitory computer readable storage device of claim 14, wherein the operations further comprise:
    initiating adjustment of the network resource based on the network instruction.

16. A method, comprising:
    receiving, by a system including a processor, power class registration data associated with a user equipment device, wherein the power class registration data indicates an alteration to a prior power class registration associated with the user equipment device requested in response to a determination, by the user equipment device in accordance with a configurable setting that allows user proximity sensing by the user equipment device to be selectively enabled or disabled, that a specific absorption rate of the user equipment device has satisfied a condition with respect to a threshold value;
    generating, by the system, a device instruction based on the power class registration data, wherein the device instruction comprises information that instructs the user equipment device to alter an operation of the user equipment device to alter a power consumption by the user equipment device; and
    sending, by the system, the device instruction to the user equipment device.

17. The method of claim 16, further comprising:
    generating, by the system, a network instruction based on the power class registration data.

18. The method of claim 17, further comprising:
    adjusting, by the system, a network resource based on the network instruction.

19. The non-transitory computer readable storage device of claim 13, wherein the device instruction comprises an instruction to adjust a user plane power of the device.

20. The non-transitory computer readable storage device of claim 13, wherein the device instruction comprises an instruction to modify a parameter of transmissions sent from the device.

* * * * *